(12) United States Patent
Deng et al.

(10) Patent No.: US 11,967,872 B2
(45) Date of Patent: Apr. 23, 2024

(54) ELECTRIC MACHINE STATOR AND VEHICLE ELECTRIC MACHINE CONTAINING THE SAME

(71) Applicant: FORD GLOBAL TECHNOLOGIES, LLC, Dearborn, MI (US)

(72) Inventors: Chuan Deng, Nanjing (CN); Guohua Du, Nanjing (CN); Yigang Yuan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 17/546,416

(22) Filed: Dec. 9, 2021

(65) Prior Publication Data

US 2022/0181937 A1 Jun. 9, 2022

(30) Foreign Application Priority Data

Dec. 9, 2020 (CN) .......................... 202011426535.7

(51) Int. Cl.
*H02K 3/12* (2006.01)
*H02K 1/16* (2006.01)
*H02K 3/28* (2006.01)
*H02K 3/48* (2006.01)

(52) U.S. Cl.
CPC .............. *H02K 3/12* (2013.01); *H02K 1/165* (2013.01); *H02K 3/28* (2013.01); *H02K 3/48* (2013.01)

(58) Field of Classification Search
CPC ........... H02K 1/165; H02K 3/12; H02K 3/28; H02K 3/48
USPC ......................................................... 310/179
See application file for complete search history.

(56) References Cited

U.S. PATENT DOCUMENTS

| | | | |
|---|---|---|---|
| 6,566,784 B1 * | 5/2003 | Hsu ........................ | H02K 1/148 310/263 |
| 9,479,017 B2 | 10/2016 | Hao et al. | |
| 2011/0037339 A1 * | 2/2011 | Rahman ................. | H02K 29/03 703/7 |
| 2018/0287436 A1 * | 10/2018 | Xu .......................... | H02K 1/146 |
| 2020/0381972 A1 * | 12/2020 | Momen .................... | H02K 3/42 |
| 2022/0173627 A1 * | 6/2022 | Deng ...................... | H02K 1/276 |
| 2022/0294299 A1 * | 9/2022 | Hisada ..................... | H02K 3/48 |
| 2023/0231430 A1 * | 7/2023 | Nategh .................... | H02K 21/14 310/156.56 |

* cited by examiner

*Primary Examiner* — Rashad H Johnson
(74) *Attorney, Agent, or Firm* — Brooks Kushman PC; David B. Kelly

(57) ABSTRACT

An electric machine stator includes a stator core having annular stator laminations arranged in a stack with each lamination includes a plurality of stator teeth, adjacent teeth defining corresponding tooth slots on an inner periphery. Each stator tooth slot includes a winding area and an opening area leading to the inner periphery and including a first side and a second side. The first side and the second side each have an inner and outer tooth top, the inner and outer tooth top of the first side and the inner and outer tooth top of the second side are respectively symmetrical with respect to a center line of the opening area, and the first side and the second side are asymmetric with respect to the center line.

20 Claims, 6 Drawing Sheets

ELECTRIC MACHINE STATOR AND VEHICLE ELECTRIC MACHINE CONTAINING THE SAME

CROSS-REFERENCE TO RELATED APPLICATIONS

This application claims foreign priority benefits under 35 U.S.C. § 119(a)-(d) to CN Application 2020 114 265 357 filed Dec. 9, 2020, which is hereby incorporated by reference in its entirety.

TECHNICAL FIELD

The present disclosure generally relates to electric machine technology, and more specifically, to an electric machine stator and a vehicle electric machine containing the same.

BACKGROUND

Permanent magnet electric machines have magnets mounted on or embedded in a rotor surrounded by a stator. The magnets on the rotor are coupled with an internal magnetic field caused by current in the electric machine and generated by the electrical input to the stator winding. Torque generated by the stator winding and the rotor flux field forms a uniform torque component and a variable torque component, Total output torque of the electric machine is a combination of the two components. However, a torque ripple phenomenon is produced due to the variable torque component. The torque ripple in the electric machines is caused by the interaction between the harmonic magnetic flux generated by the permanent magnet and the current in the stator winding.

The torque ripple will cause instantaneous output torque to continuously change with time and fluctuate around a certain average value at the same time during the rotation of the electric machine, if the torque ripple is large, the stability when loaded is low. That is to say, the jitter is very large, and the stability of the speed is also affected and the energy consumption of the electric machine is thus increased.

To solve such problems, some solutions have been proposed to improve the torque ripple by adjusting the local structure of the rotor or the stator. For example, U.S. Pat. No. 9,479,017 proposes a rotor for a permanent magnet synchronous electric machine, in which a first layer of cavities is circumferentially formed within the rotor core structure. Pairs of the cavities in the first layer form V-shaped configurations and are circumferentially spaced about the rotor core structure in the first layer. A second layer of cavities is circumferentially formed within the rotor core structure. Pairs of the cavities in the second layer form V-shaped configurations and are circumferentially spaced about the rotor core structure in the second layer. A first set of permanent magnets is inserted within each cavity in the first layer, and a second set of permanent magnets is inserted within each cavity in the second layer. Each respective V-shaped configuration of the second layer having permanent magnets disposed therein extend greater than half a radial distance from the outer cylindrical wall to the inner cylindrical wall.

However, inventors of the present disclosure have realized that there is still room for further improvement in this type of solution in the prior art.

SUMMARY

The present disclosure summarizes aspects of the embodiments and should not be used to limit the claims. Other implementations are contemplated in accordance with the techniques described herein, as will be apparent to those of ordinary skill in the art upon examination of the following drawings and detailed description, and such implementations are intended to be within the scope of this application.

The inventors of the present disclosure have realized that there is a need for an electric machine stator and a vehicle electric machine containing the same, which can significantly reduce the torque ripple by simply changing the local topology of the stator without reducing the torque, thereby improving output stability and reducing the overall energy consumption of the electric machine.

According to an aspect of the present disclosure, an electric machine stator is provided, comprising: a stator winding and a stator core including a plurality of annular stator laminations arranged in a stack, each stator lamination including a plurality of stator tooth slots on an inner periphery, and each stator tooth slot comprising a winding area for arranging the stator winding and an opening area leading to the inner periphery and including a first side and a second side. The first side and the second side each have an inner and outer tooth top, the inner and outer tooth top of the first side and the inner and outer tooth top of the second side are respectively symmetrical with respect to a center line of the opening area, and the first side and the second side are asymmetric with respect to the center line.

According to an embodiment of the present disclosure, the first side has a symmetry line that is symmetric about a line connecting the inner and outer tooth top, and the symmetry line and the second side are symmetrical with respect to the center line of the opening area.

According to an embodiment of the present disclosure, the plurality of stator laminations comprises a first set of stator laminations and a second set of stator laminations, and the first set of stator laminations has a 180° flipped symmetric figure that coincides with the second set of stator laminations in an axial direction.

According to an embodiment of the present disclosure, the first set of stator laminations are gathered to form a first stacked part, the second set of stator laminations are gathered to form a second stacked part, and the first stacked part and the second stacked part are adjacent to each other in the axial direction.

According to an embodiment of the present disclosure, the first set of stator laminations and the second set of stator laminations are alternately arranged with each other.

According to an embodiment of the present disclosure, the first side has a first arc-shaped section with an arc center located inside the stator tooth slot, and the second side has a second arc-shaped section with an arc center located outside the stator tooth slot.

According to an embodiment of the present disclosure, the first side and the second side are S-shaped or arched, respectively.

According to an embodiment of the present disclosure, the first side and the second side are 90° rotationally symmetrical about an intersection of lines connecting the respective inner and outer tooth top.

According to an embodiment of the present disclosure, each stator tooth slot further comprises a transition area between the opening area and the inner periphery.

According to an aspect of the present disclosure, an electric machine stator is provided, comprising a stator winding and a stator core including a plurality of annular stator laminations arranged in a stack, each stator lamination including a plurality of stator tooth slots on an inner periphery. Each stator tooth slot comprises a winding area for arranging the stator winding and an opening area narrowed to the inner periphery and including a first side and a second side. The first side and the second side each have an inner and outer tooth top, the inner and outer tooth top of the first side and the inner and outer tooth top of the second side are respectively symmetrical with respect to a center line of the opening area, the first side and/or the second side has/have arc-shaped sections and the first side and the second side are asymmetric with respect to the center line.

According to an embodiment of the present disclosure, the first side has a symmetry line that is symmetric about a line connecting the inner and outer tooth top and the symmetry line and the second side are symmetrical with respect to the center line of the opening area.

According to an embodiment of the present disclosure, the plurality of stator laminations comprises a first set of stator laminations and a second set of stator laminations, and the first set of stator laminations has a 180° flipped symmetric figure that coincides with the second set of stator laminations in an axial direction.

According to an embodiment of the present disclosure, the first set of stator laminations are gathered to form a first stacked part, the second set of stator laminations are gathered to form a second stacked part, and the first stacked part and the second stacked part are adjacent to each other in the axial direction.

According to an embodiment of the present disclosure, the first set of stator laminations and the second set of stator laminations are alternately arranged with each other.

According to an embodiment of the present disclosure, the first side has a first arc-shaped section with an arc center located inside the stator tooth slot, and the second side has a second arc-shaped section with an arc center located outside the stator tooth slot.

According to an embodiment of the present disclosure, the first side and the second side are S-shaped or arched, respectively.

According to an embodiment of the present disclosure, the first side and the second side are 90° rotationally symmetrical about an intersection of lines connecting the respective inner and outer tooth top.

According to an embodiment of the present disclosure, each stator tooth slot further comprises a transition area between the opening area and the inner periphery.

According to an aspect of the present disclosure, a vehicle electric machine is provided, comprising a stator defining a cavity and a rotor arranged in the cavity, the stator comprising a stator winding and a stator core including a plurality of annular stator laminations arranged in a stack, each stator lamination including a plurality of stator tooth slots arranged on an inner periphery facing the cavity. Each stator tooth slot comprises a winding area for arranging the stator winding and an opening area leading to the inner periphery and including a first side and a second side. The first side and the second side each have an inner and outer tooth top, the inner and outer tooth top of the first side and the inner and outer tooth top of the second side are respectively symmetrical with respect to a center line of the opening area, and the first side and the second side are asymmetric with respect to the center line.

According to an embodiment of the present disclosure, the plurality of stator laminations comprises a first set of stator laminations and a second set of stator laminations, and the first set of stator laminations has a 180° flipped symmetric figure that coincides with the second set of stator laminations in an axial direction.

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art, such that features of one or more embodiments may be combined to form embodiments that are not explicitly illustrated or described. Further in the figures, like referenced numerals refer to like parts throughout the different figures.

DETAILED DESCRIPTION

Figure 1:
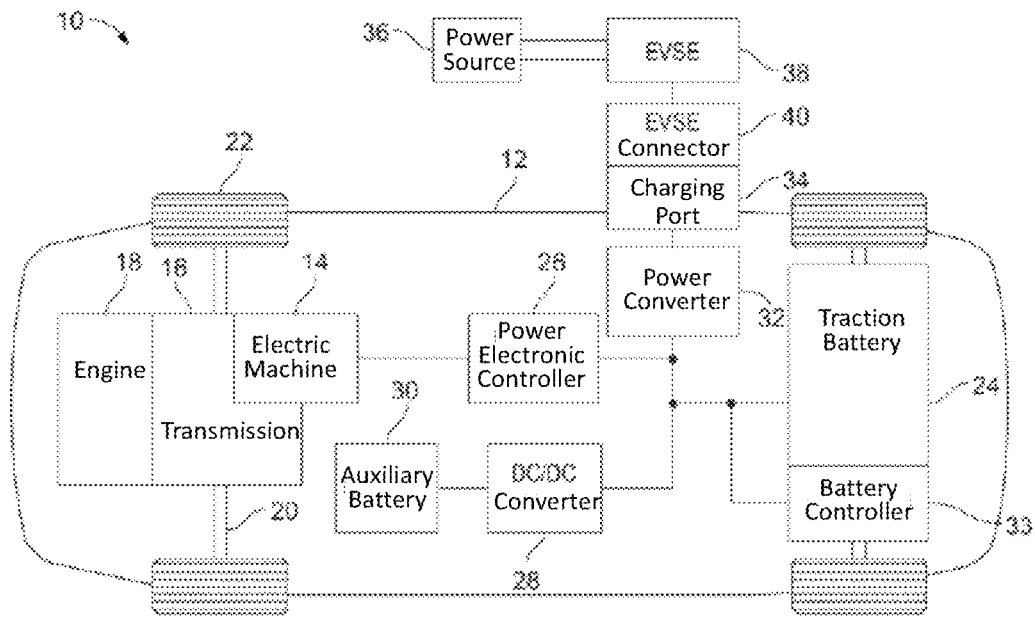
FIG. 1 shows a block diagram of an electric vehicle including a vehicle electric machine according to one or more embodiments of the present disclosure.

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In this application, when an element or a part is referred to as being "on", "joined to", "connected to" or "coupled to" another element or part, the element or part may be directly on another element or part, joined, connected or coupled to another element or part, or there may be intervening elements or parts. In contrast, when an element is referred to as being "directly on", "directly joined to", "directly connected to" or "directly coupled to" another element or part, there may be no intervening elements or parts. Other words used to describe the relationship between elements should be interpreted in a similar manner.

As mentioned in the background above, the inventors of the present disclosure have realized that in the solutions in the prior art, there is still room for improvement in terms of how to significantly reduce the torque ripple by simply changing the local topology of the stator without reducing the torque, thus to improve output stability and reduce the overall energy consumption of the electric machine. For example, the inventors have realized that certain adjustments to the topology of the stator tooth slots on the electric machine stator that are used to house the stator winding can significantly reduce the torque ripple. In view of these problems in the prior art, the inventors of the present disclosure propose an electric machine stator and a vehicle electric machine containing the same in one or more embodiments, which is believed to be able to solve one or more problems in the prior art.

In existing electric machines, such as permanent magnet electric machines, the magnets mounted on or embedded in the rotor of the electric machine are coupled with the internal magnetic field caused by the current in the electric machine stator. Individual stator teeth in combination with the stator winding form a plurality of magnetic poles that generate the flux flow pattern when a multi-phase sinusoidal voltage and current pass through the stator winding coils. For example, a three-phase electric machine will have a total of 8 poles and 48 slots. The flux generated by the stator windings interacts with rotor flux generated by the magnets in the electric machine rotor, so that a rotor torque is generated when the stator windings are excited by a polyphase voltage.

The magnets of the rotor may be positioned or oriented in different ways to generate the desired magnetic field. Each magnetic pole may be formed by a single magnet oriented in a radially outward direction with one magnetic pole (i.e., north or south pole). The magnets include, but are not limited to, ferrite magnets, AlNiCo magnets, rare earth magnets, and so on. The magnetic poles of the rotor may also be formed by multiple sets of magnets arranged to form the magnetic poles together. One such arrangement orients the magnets in a V-shaped configuration. The inner part of the "V" has similar magnetic poles that cooperate to form a rotor pole. Each magnet can be placed in an elongated hole to maintain its position. These elongated holes are generally rectangular and are arranged to match the shape of the magnets. The elongated holes may be slightly larger at opposite ends to limit leakage of flux between the north and south poles of the individual magnets. Voids or cavities in a rotor core hinder the flux because vacuum has a relatively low magnetic permeability compared to materials of the rotor core (e.g., electrical steel).

FIG. 1 depicts a block diagram of an electrified vehicle 12 including an electric machine stator or a vehicle electric machine according to one or more embodiments of the present disclosure. In the context of the present disclosure, the electrified vehicle 12 may be, for example, a plug-in hybrid electric vehicle (PHEV), a full hybrid electric vehicle (FHEV), a mild hybrid electric vehicle (MHEV), a battery electric vehicle (BEV), etc.

In the embodiment of FIG. 1, the vehicle 12 includes one or more electric machines 14 mechanically connected to a hybrid transmission 16. The electric machine 14 can operate as a motor or a generator. In addition, the hybrid transmission 16 may be mechanically connected to an engine 18. The hybrid transmission 16 may also be mechanically connected to a drive shaft 20, which is mechanically connected to wheels 22. When the engine 18 is activated or shut down, the electric machine 14 may provide propulsion and/or braking. The electric machine 14 can also be operated as a generator, and can provide fuel economy benefits by recovering energy that is normally lost as heat in a friction braking system. The electric machine 14 can also provide reduced pollutant emissions because the hybrid electric vehicle 12 can be operated in an electric mode or a hybrid mode under certain conditions, which can reduce the overall fuel consumption of the vehicle 12.

A traction battery (or battery pack) 24 stores and provides energy that can be used by the electric machine 14. The traction battery 24 may provide a high voltage DC (direct current) output from one or more battery cell arrays (sometimes referred to as a battery cell stack) within the traction battery 24. The battery cell array may include one or more battery cells. The traction battery 24 may be electrically connected to one or more power electronic controllers 26 through one or more contactors (not shown). One or more contactors isolate the traction battery 24 from other components when opened, and connect the traction battery 24 to the other components when closed.

The power electronic controller 26 may also be electrically connected to the electric machine 14 and may be configured to transfer electric energy between the traction battery 24 and the electric machine 14 in both directions. For example, the traction battery 24 may provide a DC voltage, while the electric machine 14 may require a three-phase AC (alternating current) voltage when running. The power electronic controller 26 can convert the DC voltage into the three-phase AC voltage according to the requirements of the electric machine 14. In a regenerative mode, the power electronic controller 26 can convert the three-phase AC voltage from the electric machine 14 acting as a generator into the DC voltage required by the traction battery 24. Those skilled in the art can understand that the parts described herein are also applicable to pure electric vehicles. For the pure electric vehicle, the hybrid transmission 16 may be a gear box connected to the electric machine 14, and the engine 18 can be absent.

In addition to providing energy for propulsion, the traction battery 24 can also provide energy for other vehicle electrical systems. A DC/DC converter 28 can convert the high-voltage DC output of the traction battery 24 into a low-voltage DC power source compatible with other vehicle loads. Other high-voltage loads (such as compressors and electric heaters) can be directly connected to the high-voltage without using the DC/DC converter 28. A low-voltage system may be electrically connected to an auxiliary battery 30 (for example, a 12V battery).

A battery controller 33 may communicate with the traction battery 24. The battery controller 33 may be configured to monitor and manage the operation of the traction battery 24, such as by an electronic monitoring system (not shown) that manages the temperature and state of charge of each battery cell.

The traction battery 24 can be recharged by an external power source 36. The external power source 36 may be a connection to a power socket. The external power source 36 may be electrically connected to an electric vehicle supply equipment (EVSE) 38. The EVSE 38 may provide circuits and controls for managing the power transfer between the power source 36 and the vehicle 12. The external power source 36 may provide DC or AC power to the EVSE 38.

The EVSE 38 may have a charging connector 40 for plugging into a charging port 34 of the vehicle 12. The charging port 34 may be any type of port configured to transfer power from the EVSE 38 to the vehicle 12. The charging port 34 may be electrically connected to a charger or a power converter 32. The power converter 32 may adjust the power supplied from the EVSE 38 to provide the traction battery 24 with appropriate voltage and current levels. The power converter 32 may interface with the EVSE 38 to coordinate power delivery to the vehicle 12. The EVSE connector 40 may have pins that mate with corresponding grooves of the charging port 34.

Figure 2:
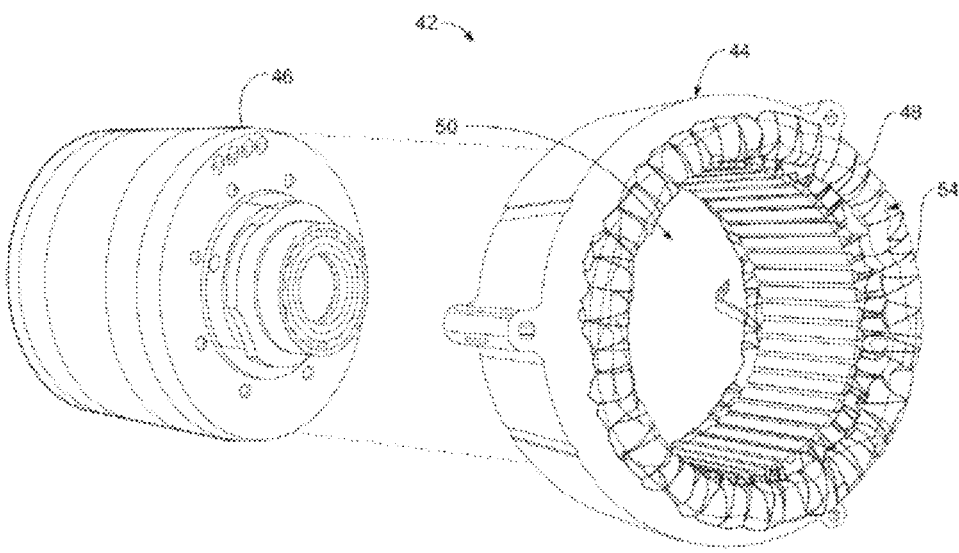
FIG. 2 shows a schematic diagram of a representative electric machine according to one or more embodiments of the present disclosure.

FIG. 2 shows a representative electric machine according to one or more embodiments of the present disclosure, generally referred to herein as electric machine 42. The electric machine 42 may include a stator 44 and a rotor 46. In some embodiments for vehicles, the electrified vehicle 12 may include two electric machines. One electric machine can be operated mainly as a motor, and the other electric machine can be operated mainly as a generator. The motor can be used to convert electric power into mechanical power, and the generator can be used to convert mechanical power into electric power.

In one example, referring to FIG. 2, the stator 44 may define a cavity 50. The rotor 46 can be sized to be set and operated in the cavity 50. A shaft (not shown) operatively connected to the rotor 46 can drive the rotor 46 to rotate and/or transfer rotational energy generated by the operation of the rotor 46 to one or more subsystems of the vehicle 12. The stator 44 may include a winding 48 disposed around an outer periphery of the cavity 50 to surround an outer surface of the rotor 46. In the example of the electric machine operated as a motor, current may be fed to the winding 48 to rotate the rotor 46. In the example of the electric machine operated as a generator, current can be generated in the winding 48 by the rotation of the rotor 46 so as to power the components of the vehicle 12.

Figure 3:
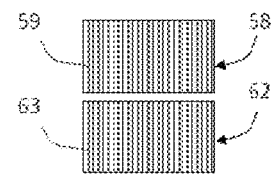
FIG. 3 shows a partial cross-sectional view of a representative electric machine according to one or more embodiments of the present disclosure.
Figure 3:
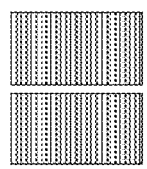

FIG. 3 shows a partial cross-sectional view of the electric machine 42. In one or more embodiments, the rotor 46 includes a rotor core 62 formed of one or more rotor laminations 63. The stator 44 may include a stator core 58 formed of one or more stator laminations 59. The rotor core 62 rotates relative to the stator core 58 about an axis 54.

Figure 5:
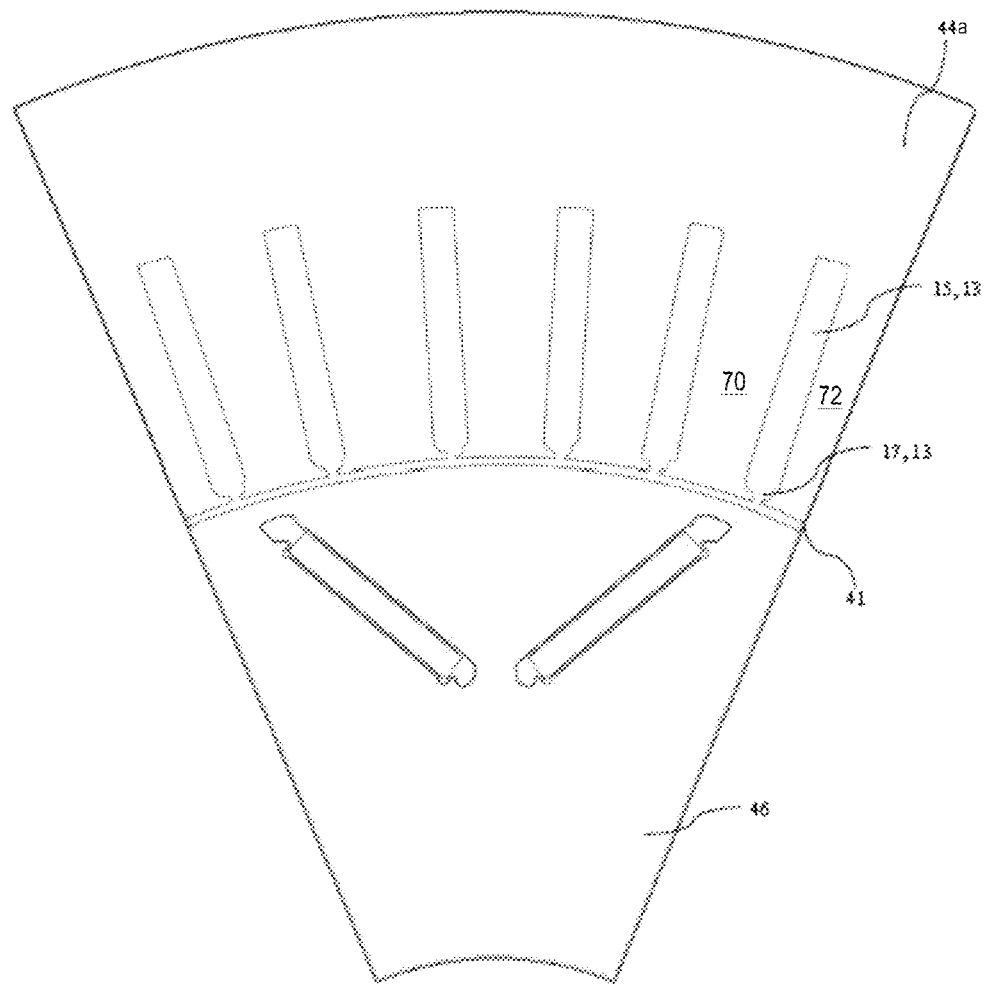
FIG. 5 shows a partial radial cross-sectional view of an electric machine including an electric machine stator according to one or more embodiments of the present disclosure.

Continuing to refer to FIGS. 2 and 3, and further to FIG. 5, which shows a partial radial cross-sectional view of an electric machine including an electric machine stator according to one or more embodiments of the present disclosure, the electric machine stator 44 comprises a stator winding 48 and a stator core 58 including a plurality of annular stator laminations 59 arranged in a stack. Each stator lamination 59 includes a plurality of stator tooth slots 13 on an inner periphery 41, and each stator tooth slot 13 comprises a winding area 15 for arranging the stator winding 48 and an opening area 17 leading to the inner periphery 41. Each stator tooth slot 13 is formed by adjacent stator teeth 70, 72 that extend from a base or back iron portion 44a toward the inner periphery 41.

Figure 6:
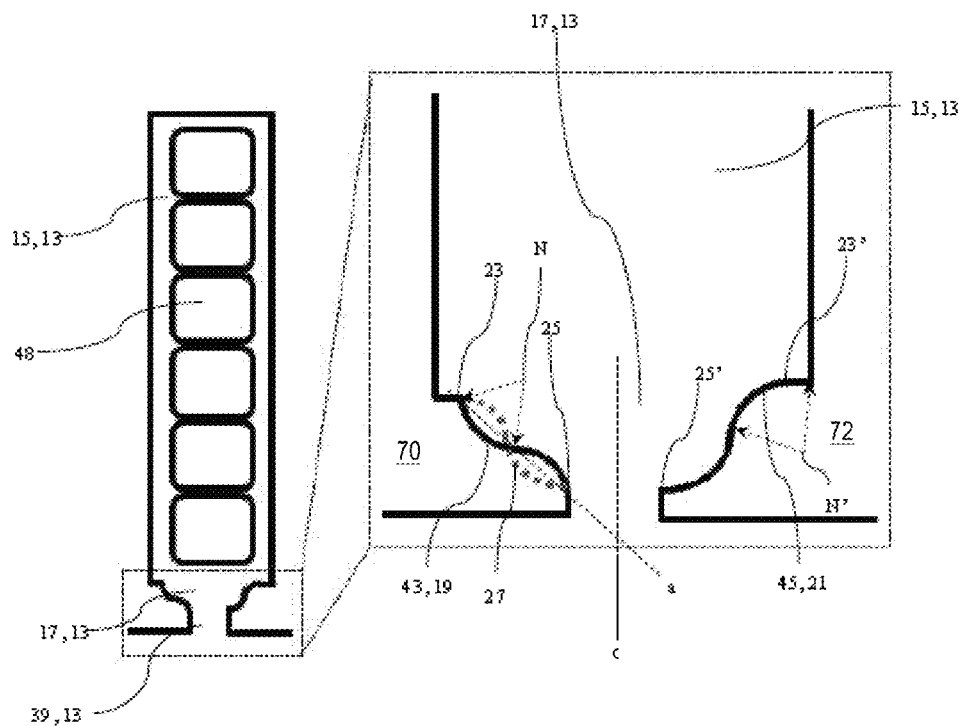
FIG. 6 shows an enlarged view of a stator tooth slot of an electric machine stator according to one or more embodiments of the present disclosure.
Figure 7:
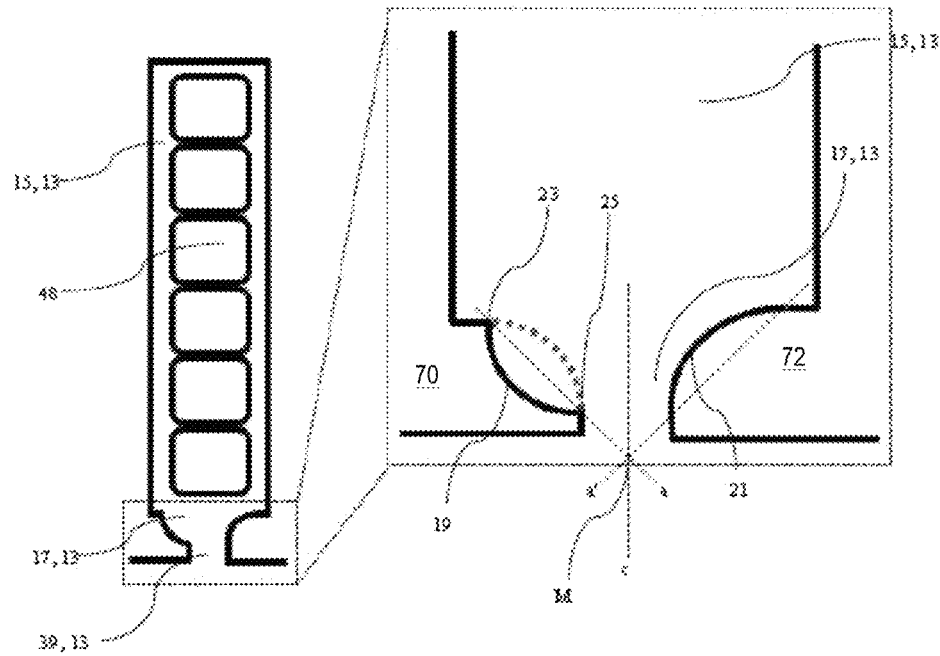
FIG. 7 shows an enlarged view of a stator tooth slot of an electric machine stator according to one or more embodiments of the present disclosure.

It can be seen from the enlarged view of the stator teeth and corresponding tooth slots of the electric machine stator according to one or more embodiments of the present disclosure shown in FIGS. 6 and 7 that the opening area 17 includes a first side 19 and a second side 21, wherein the first side 19 of tooth 70 has an inner and outer tooth top 23, 25, and the second side 21 of tooth 72 has an inner and outer tooth top 23', 25'. With reference to the partial enlarged views of the stator tooth slot in FIGS. 6-9, the inner tooth top 23 of the first side 19 and the inner tooth top 23' of the second side 21 are symmetrical with respect to a center line c of the opening area 17, the outer tooth top 25 of the first side 19 and the outer tooth top 25' of the second side 21 are symmetrical with respect to the center line c of the opening area 17, and the first side 19 and the second side 21 are asymmetrical with respect to the center line c.

Figure 4:
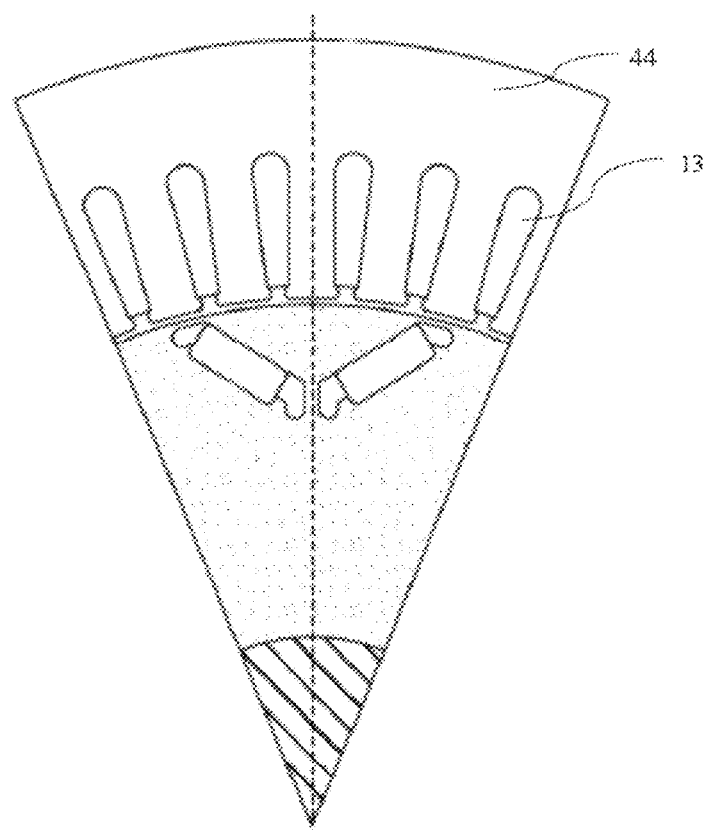
FIG. 4 shows a partial cross-sectional view of an electric machine in the prior art.

As can be seen in FIGS. 5 to 9, the stator tooth slots 13 formed by adjacent teeth 70, 72 are narrowed at the opening area 17. Each tooth 70, 72 has a terminal portion at the inner periphery 41 having a first side 19 and a second side 21. Stated differently, the left side of tooth 70, which is not explicitly illustrated in FIGS. 6 to 9, has the same shape or configuration as the left side of tooth 72 as shown. Similarly, the right side of tooth 72, whish is not explicitly illustrated in FIGS. 6-9, has the same shape or configuration as the right side of tooth 70 as shown. In the context of the present disclosure, the inner tooth top 23, 23' refer to the position where the stator tooth slots 13 begins to narrow obliquely, and the outer tooth top 25, 25' refer to the position where the oblique narrowing of the stator tooth slots 13 ends. The terms "inner" and "outer" here indicate whether it is closer to the inside of the stator tooth slot 13 or closer to the outside of the stator tooth slot 13. Those skilled in the art will understand that the "inner" and "outer" only indicate relative orientations, and can actually be referred to in other ways. In addition, in some embodiments, the center line c of the opening area 17 may also be the center line of each stator tooth slot 13 at the same time. Compared with the stator of the present disclosure, the stator tooth slots of the stator in the prior art are usually symmetrically designed, as shown in the schematic diagram of the stator in the prior art in FIG. 4.

Figure 10:
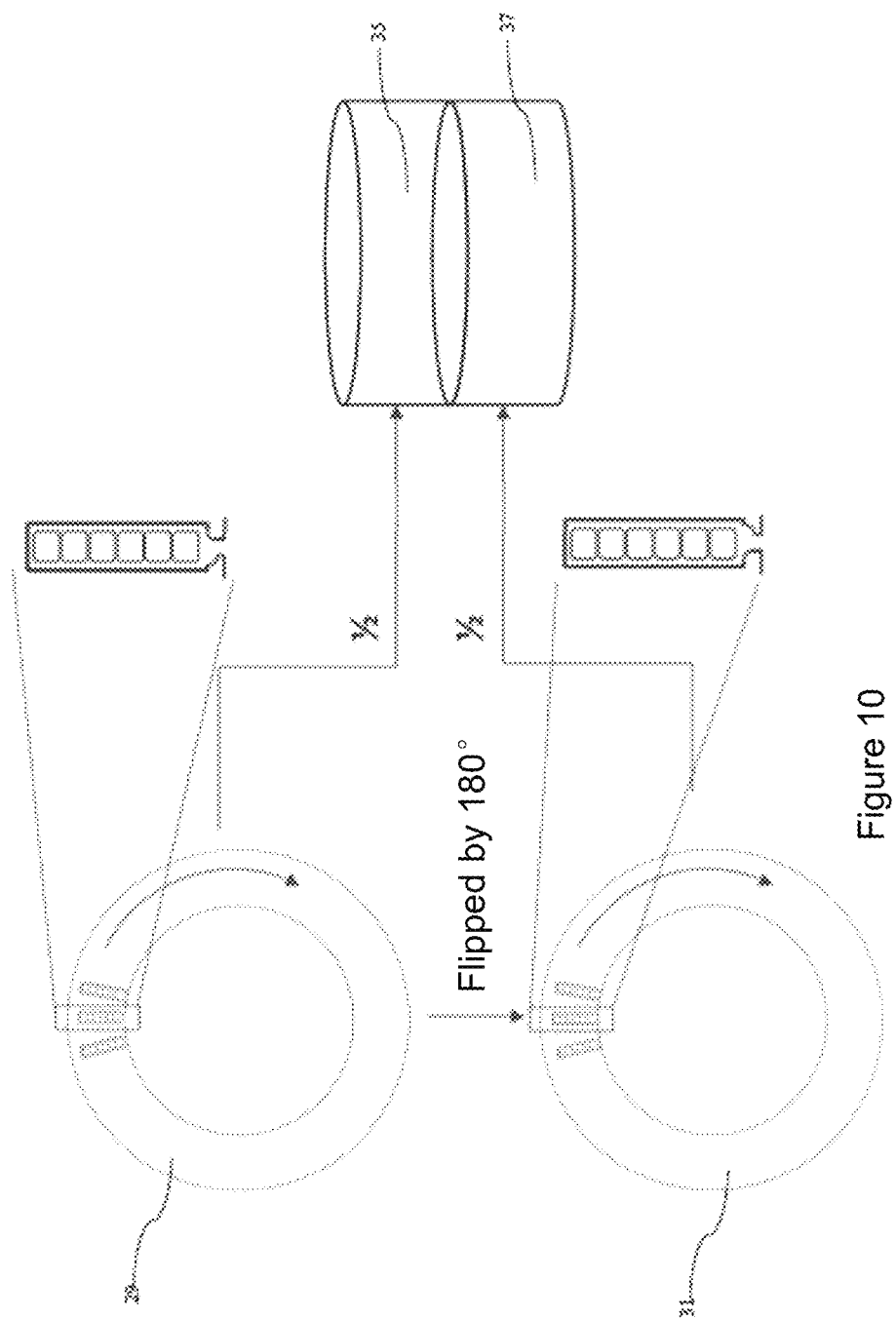
FIG. 10 shows a schematic diagram of a stacking manner of stator laminations of an electric machine stator according to one or more embodiments of the present disclosure.

According to some embodiments of the present disclosure, referring to FIG. 10, the plurality of stator laminations 59 comprises a first set of stator laminations 29 and a second set of stator laminations 31. The first set of stator laminations 29 has a 180° flipped symmetric figure that coincides with the second set of stator laminations 31 in an axial direction. That is to say, when a part of all the stator laminations 59 stacked in alignment is flipped over by 180°, the flipped part and the remaining unflipped part of the stator laminations 59 respectively constitute the first set of stator laminations 29 and the corresponding second set of stator laminations 31. This ensures the consistency of performance of the electric machine according to the present disclosure in the forward and reverse rotation directions of the rotor. In some further embodiments of the present disclosure, the number of the first set of stator laminations 29 and the number of the second set of stator laminations 31 are equal.

According to some further embodiments of the present disclosure, the first set of stator laminations 29 are gathered to form a first stacked part 35, the second set of stator laminations 31 are gathered to form a second stacked part 37, the first stacked part 35 and the second stacked part 37 are adjacent to each other in the axial direction, as shown in FIG. 10. In some other embodiments, there are two first stacked parts 35 and two second stacked parts 37 that are alternately arranged with each other.

In some further embodiments, the first set of stator laminations 29 and the second set of stator laminations 31 are arranged alternately with each other. In other words, each of the first set of stator laminations 29 is adjacent to only two (one in the case of two ends) of the second set of stator laminations 31. Similarly, each of the second set of stator laminations 31 is adjacent to only two (one in the case of two ends) of the first set of stator laminations 29.

According to some embodiments of the present disclosure, referring to FIG. 6, the first side 19 has a symmetry line 27 with respect to a line a connecting the inner and outer tooth top 23 and 25, and the symmetry line 27 and the second side 21 are symmetrical with respect to the center line c of the opening area 17. Of course, the reverse is also true, that is, a symmetry line of the second side 21 with respect to a line connecting the inner and outer tooth top 23', 25' and the first side are symmetrical with respect to the center line of the opening area. It should be noted that the symmetry line 27 is not a real line, but an auxiliary line drawn to show the spatial relationship between the first side 19 and the second side 21.

In some embodiments of the present disclosure, with continued reference to FIGS. 6 and 7, the first side 19 has a first arc-shaped section 43 with an arc center N located inside the stator tooth slot 13, and the second side 21 has a second arc-shaped section 45 with an arc center N' located outside the stator tooth slot 13. In some further embodiments, the first side 19 may have one or more first arc-shaped sections 43, and the second side 21 may have one or more second arc-shaped sections 45.

In some further embodiments, the first side 19 and the second side 21 are respectively S-shaped, refer to the example shown in FIG. 6. In this case, the first side 19 and the second side 21 have both a first arc-shaped section and a second arc-shaped section, respectively. In other embodiments, the first side 19 and the second side 21 are respectively arched, as shown in the example in FIG. 7.

According to some embodiments of the present disclosure, as shown in FIG. 7, the inner and outer tooth top 23 and 25 of the first side 19 are connected by line a, and the inner and outer tooth top 23' and 25' of the second side 21 are connected by line a'. The line a and the line a' intersect at an intersection M, and the first side 19 and the second side 21 are 90° rotationally symmetrical about the intersection M. In other words, the first side 19 will coincide with the second side 21 after being rotated 90° in the direction of the second side 21 with the intersection M as the center. The reverse is also true, and the second side 21 will also coincide with the first side 19 after being rotated 90° in the direction of the first side 19 with the intersection M as the center.

Figure 8:
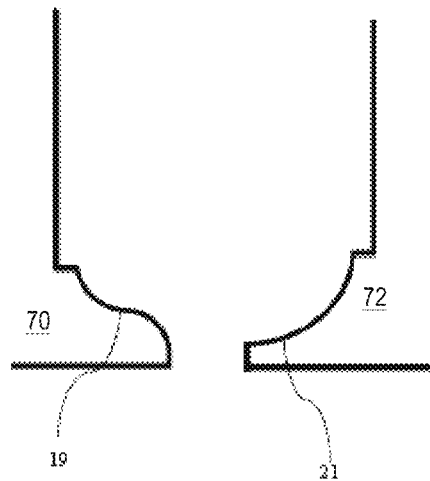
FIG. 8 shows a partial enlarged view of a stator tooth slot of an electric machine stator according to one or more embodiments of the present disclosure.
Figure 9:
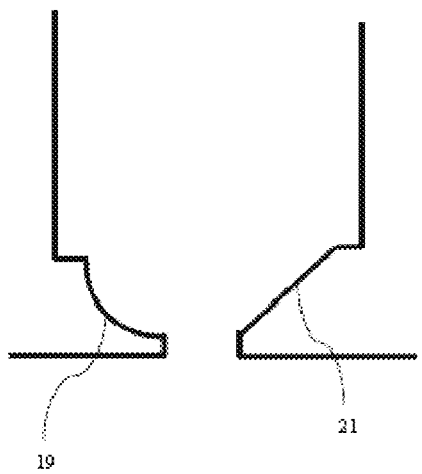
FIG. 9 shows a partial enlarged view of a stator tooth slot of an electric machine stator according to one or more embodiments of the present disclosure.

FIGS. 8 and 9 show other optional shapes of the first side 19 and the second side 21 of the opening area 17 of the stator tooth slot 13 of the stator according to the present disclosure. Those skilled in the art can understand that other shapes can also be conceived without going beyond the scope disclosed in this disclosure, which are also within the protection scope of the claims of the present disclosure.

In some embodiments of the present disclosure, as shown in FIGS. 6 and 7, the stator tooth slot 13 may further include a transition area 39 between the opening area 17 and the inner periphery 41. In some embodiments, edges of the transition area are substantially parallel and connected to the inner periphery 41 of the stator lamination 59. Those skilled in the art can understand that other shapes of the transition area 39 or excluding the transition area can also be used.

Table 1 shows the torque ripple of the electric machines according to conventional design and a representative embodiment of the present disclosure under the 24th and 48th mechanical frequencies at a rotation speed of 1000 rpm. In this embodiment, the electric machine according to the conventional design has a symmetrical stator tooth slot design. It can be seen that the torque ripple of the electric machine according to the present disclosure with an asymmetrical tooth slot design has been significantly improved compared with the conventional design under the 24th and 48th mechanical frequencies, and the pulsation percentage has been reduced from 3.42% and 1.07% to 3.34% and 0.71%, respectively. In general, smaller values have associated smaller ripple, smoother torque output, and lower noise.

TABLE 1

| Harmonics | Conventional Design | | Present Disclosure | |
| --- | --- | --- | --- | --- |
| | Torque/Nm | Pulsation Percentage/% | Torgue/Nm | Pulsation Percentage/% |
| Fundamental Waveform Torque | 229.35 | — | 229.91 | — |
| $24^{th}$ | 7.85 | 3.42% | 7.68 | 3.34% |
| $48^{th}$ | 2.45 | 1.07% | 1.63 | 0.71% |

According to another aspect of the present disclosure, referring again to FIGS. 2 to 9, an electric machine stator 44 is also provided, comprising a stator winding 48 and a stator core 58. The stator core 58 includes a plurality of annular stator laminations 59 arranged in a stack, and each stator lamination 59 includes a plurality of stator tooth slots 13 on an inner periphery 41. Each stator tooth slot 13 comprises a winding area 15 for arranging the stator winding 48 and an opening area 17 narrowed to the inner periphery 41. The opening area 17 includes a first side 19 and a second side 21. The first side 19 has an inner and outer tooth top 23 and 25, and the second side 21 has inner and outer tooth top 23', 25'. The inner and outer tooth top 23, 25 of the first side 19 and the inner and outer tooth top 23', 25' of the second side 21 are symmetrical with respect to a center line c of the opening area 17, respectively. One or both of the first side 19 and the second side 21 have arc-shaped sections, and both the first side 19 and the second side 21 are asymmetric with respect to the center line c. It should be understood that all the embodiments, features and advantages described above for the electric machine stator according to the first aspect of the present disclosure are equally applicable to the electric machine stator according to the other aspect of the present disclosure, provided that they do not conflict with each other. That is to say, all the above-mentioned embodiments and their variants can be directly transferred and combined with this. For the sake of brevity of the present disclosure, the description will not be repeated here.

According to yet another aspect of the present disclosure, referring to FIG. 2, a vehicle electric machine 14 is also provided, comprising a stator 44 defining a cavity 50 and a rotor 46 disposed in the cavity 50. The electric machine stator 44 includes a stator winding 48 and a stator core 58 including a plurality of annular stator laminations 59 arranged in a stack. Each stator lamination 59 includes a plurality of stator tooth slots 13 on an inner periphery 41, and each stator tooth slot 13 comprises a winding area 15 for arranging the stator winding 48 and an opening area 17 leading to the inner periphery 41. The opening area 17 includes a first side 19 and a second side 21. The first side 19 has an inner and outer tooth top 23 and 25, and the second side 21 has an inner and outer tooth top 23', 25'. The inner tooth top 23 of the first side 19 and the inner tooth top 23' of the second side 21 are symmetrical with respect to a center line c of the opening area 17, the outer tooth top 25 of the first side 19 and the outer tooth top 25' of the second side 21 are symmetrical with respect to the center line c of the opening area 17, and the first side 19 and the second side 21 are asymmetrical with respect to the center line c. Likewise, all the embodiments, features and advantages described above for the electric machine stator 44 according to the present disclosure are equally applicable to the vehicle electric machine 14 according to the present disclosure, and will not be repeated here.

In summary, compared with the prior art, the present disclosure proposes an electric machine stator and a vehicle electric machine containing the same, which can significantly reduce torque ripple by simply changing the local topology of the stator without reducing the torque, thereby improving output stability and reducing the overall energy consumption of the electric machine.

Where it is technically possible, the technical features listed in relation to different embodiments can be combined with each other to form further embodiment within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present disclosure and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present disclosure (including claims) is limited to these examples; under the overall concept of the invention, the technical features in the above embodiments or different embodiments can be combined with each other to produce many other their variants in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

What is claimed is:

1. An electric machine stator, comprising:
a stator winding; and
a stator core including a plurality of annular stator laminations arranged in a stack, each stator lamination including a plurality of stator teeth with adjacent teeth defining tooth slots extending toward an inner periphery, and each stator tooth slot including:
a winding area configured to receive the stator winding; and
an opening area leading to the inner periphery and including a first side and a second side, wherein, the first side and the second side each have an inner and outer tooth top, the inner and outer tooth top of the first side and the inner and outer tooth top of the second side are respectively symmetrical with respect to a center line of the opening area, and the first side and the second side are asymmetric with respect to the center line.

2. The electric machine stator of claim 1, wherein the first side has a symmetry line that is symmetric about a line connecting the inner and outer tooth top, and the symmetry line and the second side are symmetrical with respect to the center line of the opening area.

3. The electric machine stator of claim 1, wherein the plurality of stator laminations comprises a first set of stator laminations and a second set of stator laminations, and wherein the first set of stator laminations is flipped 180° about a diametrical axis of the stator relative to the second set of stator laminations.

4. The electric machine stator of claim 3, wherein the first set of stator laminations form a first contiguous half of the stator core and the second set of stator laminations form a second contiguous half of the stator core.

5. The electric machine stator of claim 3, wherein the first set of stator laminations and the second set of stator laminations are alternately arranged with each other.

6. The electric machine stator of claim 1, wherein the first side has a first arc-shaped section with an arc center located inside the stator tooth slot, and the second side has a second arc-shaped section with an arc center located outside the stator tooth slot.

7. The electric machine stator of claim 6, wherein the first side and the second side are S-shaped or arched, respectively.

8. The electric machine stator of claim 1, wherein the first side and the second side are 90° rotationally symmetrical about an intersection of lines connecting the respective inner and outer tooth top.

9. The electric machine stator of claim 1, wherein each stator tooth slot further comprises a transition area between the opening area and the inner periphery.

10. An electric machine stator, comprising:
a stator core including a plurality of annular stator laminations arranged in a stack, each stator lamination including a plurality of stator teeth with adjacent teeth defining associated tooth slots extending from a back iron portion toward an inner periphery, each stator tooth including a winding area configured to receive stator windings and an opening area narrowed to the inner periphery and including a first side and a second side,
wherein the first side and the second side each have an inner and outer tooth top, the inner and outer tooth top of the first side and the inner and outer tooth top of the second side are respectively symmetrical with respect to a center line of the opening area, at least one of the first and second sides has an arc-shaped section and the first side and the second side are asymmetric with respect to the center line.

11. The electric machine stator of claim 10, wherein the first side has a symmetry line that is symmetric about a line connecting the inner and outer tooth top and the symmetry line and the second side are symmetrical with respect to the center line of the opening area.

12. The electric machine stator of claim 10, wherein the plurality of stator laminations comprises a first set of stator laminations and a second set of stator laminations, and the first set of stator laminations has a 180° flipped orientation about a diametrical axis of the stator relative to the second set of stator laminations.

13. The electric machine stator of claim 12, wherein the first set of stator laminations are adjacent one another to form a first stacked part, the second set of stator laminations are adjacent one another to form a second stacked part, and the first stacked part and the second stacked part are adjacent to each other in the axial direction.

14. The electric machine stator of claim 12, wherein laminations of the first set of stator laminations are alternately arranged with laminations of the second set of stator laminations.

15. The electric machine stator of claim 10, wherein the first side has a first arc-shaped section with an arc center located inside the stator tooth slot, and the second side has a second arc-shaped section with an arc center located outside the stator tooth slot.

16. The electric machine stator of claim 15, wherein the first side and the second side are S-shaped.

17. The electric machine stator of claim 10, wherein the first side and the second side are 90° rotationally symmetrical about an intersection of lines connecting the respective inner and outer tooth top.

18. The electric machine stator of claim 10, wherein each stator tooth slot further comprises a transition area between the opening area and the inner periphery.

19. A vehicle electric machine, comprising a stator defining a cavity and a rotor arranged in the cavity, the stator comprising:

a stator winding; and
a stator core including a plurality of annular stator laminations arranged in a stack, each stator lamination including a plurality stator teeth with adjacent teeth defining associated stator tooth slots arranged on an inner periphery facing the cavity, and each stator tooth slot including:
  a winding area for arranging the stator winding; and
  an opening area leading to the inner periphery and including a first side and a second side,
  wherein, the first side and the second side each have an inner and outer tooth top, the inner and outer tooth top of the first side and the inner and outer tooth top of the second side are respectively symmetrical with respect to a center line of the opening area, and the first side and the second side are asymmetric with respect to the center line.

20. The vehicle electric machine of claim 19, wherein the plurality of stator laminations comprises a first set of stator laminations and a second set of stator laminations, and wherein the first set of stator laminations has a 180° flipped orientation about a diametric axis of the stator relative to the second set of stator laminations.

* * * * *